United States Patent Office.

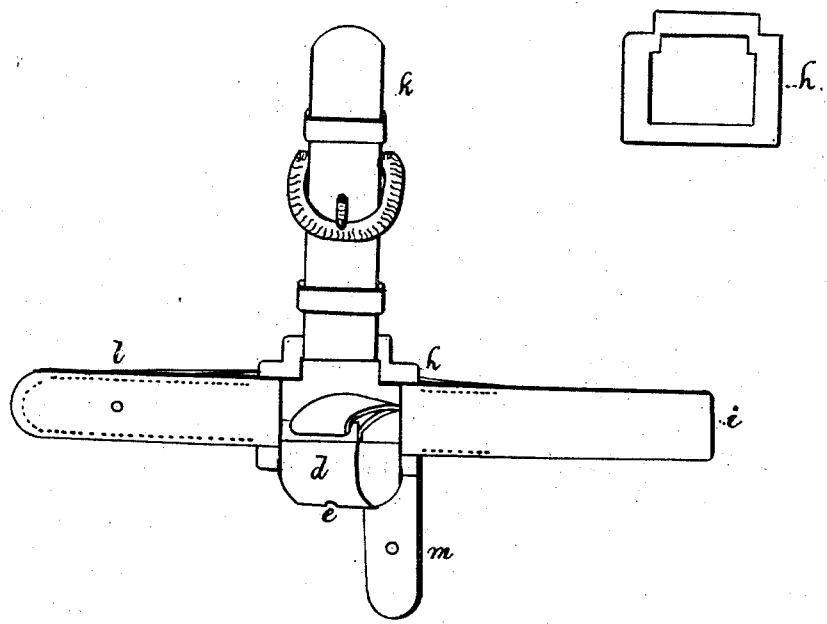

WILLIAM H. TOWNSEND, OF CAMDEN, OHIO.

Letters Patent No. 69,273, dated September 24, 1867.

---

IMPROVEMENT IN THE METHOD OF ATTACHING HORSES TO CARRIAGES.

---

*The Schedule referred to in these Letters Patent and making part of the same.*

---

TO ALL WHOM IT MAY CONCERN:

Be it known that I, W. H. TOWNSEND, of Camden, in the county of Preble, and State of Ohio, have invented a new and useful Apparatus for Attaching Horses to Carriages; and I do hereby declare that the following is a full and exact description of the same, reference being had to the accompanying drawings, and to the letters of reference marked thereon.

This invention consists of a pin on a carriage-thill, in combination with a semi-elliptic clasp for attachment to the thill by means of said pin and its own elasticity, said clasp being connected with a part of the harness, and operating in connection with the said pin as a substitute for tugs.

To enable others to make and use my invention, I will now proceed to describe its construction and operation.

A represents a carriage-thill, of ordinary construction. $b$ represents a plate, on the under side of the thill, at any convenient part thereof, provided with one or more holes to receive the pin $c$, which is to be placed in one hole or another, according to convenience. $d$ represents a semi-elliptic clasp, consisting of a framework of metal, covered with leather or other suitable material, in which material is made a hole, $e$, to pass the pin $c$ through. The clasp $d$ should be made to gripe the thill with some force, by virtue of its elasticity. $h$ represents a small metallic framework, attached to the inner end of the clasp $d$, with which framework are connected the breeching-strap $i$, the back-band $k$, and the hame-strap $l$. The strap $m$, to which the belly-band is attached, is fastened to the outer end of the clasp $d$, and passes around the thill, within the framework $h$, and, in connection with the back-band, assists in retaining the clasp on the pin $c$.

It is obvious that as there is a connection between the clasp, which forms part of the harness, and the pin on the thill, the wagon will be drawn by these means whenever the horse is put in motion. Tugs are thus rendered unnecessary, and for light wagons, (with which this invention is intended to be chiefly used,) a harness simpler and cheaper, to the extent of the lack of tugs, than those ordinarily used, is obtained.

Having thus fully described my invention, what I claim as new, and desire to secure by Letters Patent, is—

1. The clasp $d$, in combination with framework $h$ and pin $c$, substantially as and for the purpose described.

2. The clasp $d$, provided at its outer end with strap $m$, and at its inner end with back-band $k$, in manner and for purpose set forth.

This specification signed and witnessed this 22d day of May, 1867.

WILLIAM H. TOWNSEND.

Witnesses:
ROBERT CONARD,
J. S. EARLY.